Patented Oct. 11, 1938

2,132,855

UNITED STATES PATENT OFFICE 2,132,855

PRODUCTION OF VALUABLE LIQUID PRODUCTS FROM DISTILLABLE CARBONACEOUS MATERIALS

Carl Krauch and Mathias Pier, Heidelberg, Germany, assignors to Standard-I. G. Company, Linden, N. J., a corporation of Delaware No Drawing. Application September 29, 1934, Serial No. 746,146. In Germany April 25, 1925

2 Claims. (Cl. 196—53)

This application is a continuation-in-part of the application for Letters Patent Ser. No. 551,576, filed July 17th, 1931 according to which distillable carbonaceous materials, as for example solid and liquid fuels, distillation and extraction products thereof are converted into valuable liquid products, including benzine, by treatment with hydrogen at an elevated temperature sufficient to promote the conversion, at a pressure between about atmospheric and about 50 atmospheres, preferably between atmospheric pressure and 20 atmospheres in the presence of a catalyst comprising molybdenum, tungsten or compounds of these metals.

The said application Ser. No. 551,576 in turn is a continuation-in-part of the application for Letters Patent Ser. No. 86,646, filed February 6th, 1926, now U. S. Patent 1,890,434, which is concerned with the said conversion generally including preferably the use of high pressures of at least 20 atmospheres, advantageously above 50 atmospheres and being carried out at temperatures between 300–700° C. in the presence of a catalyst immune to sulphur poisoning as examples of which, tungsten and compounds thereof have been mentioned among a variety of other catalytic substances, and in which application also the idea of carrying out the operation without application of super-atmospheric pressure is disclosed.

One of the most important and widely agitated problems in the industrial world has for a long time been how to produce good gasoline or other valuable liquid fuels from solid fuel including coal in all its varieties and wood, and products of distillation, or mineral oils, especially heavy oils.

One attempt at the solution of this problem has been by liquefaction of coals by means of hydrogen or by destructive hydrogenation of tars or oils under high pressure at high temperature, but this has not reached application industrially because of an unsatisfactory speed and rate of the conversion.

By the process described in the said application for Letters Patent Ser. No. 86,646, now U. S. Patent 1,890,434, we claim to have successfully solved this problem for the first time and to be able to produce good pure liquid fuels, including also benzines from solid fuels and to convert also tars obtained from solid fuels and also heavy mineral oils or residues into more valuable liquid products, including benzines, by a process economical in material, time, labor and wear of apparatus.

In arriving at the hereindescribed process we have made several discoveries or inventions.

The object of the invention of application Ser. No. 551,576 is to provide for a process in which good results in the conversion referred to in application Ser. No. 86,646 are obtained at pressures lower than those specifically claimed in that application, namely, at pressures ranging from atmospheric pressure to less than 20 atmospheres, and the object of the present invention is to develop the process according to the said application Ser. No. 551,576.

We have found that among the many possible applications or modifications of the process in accordance with our parent application Ser. No. 86,646, valuable liquid and in particular hydrocarbon products, for example, hydrocarbons or derivatives thereof are obtained from distillable carbonaceous materials, such as substances of the nature of coal, peat and other solid fuels or products derived therefrom by distillation or extraction, such as tar, or from mineral oils, or from fractions of the said substances or from conversion products thereof, by treating them in the presence of tungsten, either as such or preferably in the form of its compounds with heat at a temperature sufficient to promote the conversion, and at atmospheric or at moderately elevated pressure, but preferably only up to about 20 atmospheres and more particularly at pressures between 5 and 20 atmospheres with hydrogen or gases containing the same. This hydrogen is usually employed in great excess over the distillable carbonaceous materials to be converted. At least 1.5 volumes of hydrogen are present for each volume of oil vapor to be converted; in practice per ton of initial carbonaceous material are employed 300, 400, 600, 1000 or 2000 cubic meters of hydrogen depending on the particular conversion desired and the nature of the initial material.

The time of contact of the gases with the catalyst will vary depending upon the character of the initial material to be treated, the temperature and pressures employed, the character of the end product desired and other factors, so that it is impossible to specify the space velocity and contact time for all conditions of operation. The contact time and space velocity may be determined by simple preliminary tests. As an example, when treating a middle oil obtained by the distillation of brown coal tar oil boiling between 225 and 318° C., at 480° C. and a pressure of 12 atmospheres 25 cubic centimeters of oil may be passed over 200 cubic centimeters of catalyst per hour.

For instance, catalytic masses containing a sulphide or oxide of tungsten may be employed. Tungstates, such as ammonium tungstate may be employed.

The tungsten may also be employed in admixture with other catalysts or with inert solid materials. The catalytic agent may also be deposited on carriers, such as pumice stone, fire clay and the like, or other refractory metals or their compounds whether possessing hydrogenating properties or not may be added to the catalytic mass or admixed thereto, such as silicates of aluminium or magnesium or mixtures thereof, in order to increase its mechanical strength and durability in the reaction chamber. Cobalt or iron, or compounds thereof, or alumina, zinc oxide, magnesia, or calcium carbonate, may also be mentioned as additions. The immunity of the catalytic agent especially against sulphur poisoning and against other impurities occurring in coal and tar is very remarkable.

Suitable initial materials are, for example, pit coal and other varieties of coal, particularly brown coal and the like, also peat, wood and similar materials, tars, obtained at very different temperatures and pressures, or mineral oils, also for example those obtained in the presence of hydrogen as well as components thereof or residues obtained therefrom by distillation or their conversion products, as for example coumarone resin or Montan wax and the like.

When employing distillation products of solid carbonaceous bodies as a starting material, the destructive hydrogenation treatment may directly follow the distillation process without an intermediate condensation of the tar vapors and the distillation may also take place under elevated pressure and, if desired, in the presence of hydrogen and catalysts.

The preferred form of carrying out the process is generally a continuous operation with a stream of the gases and the materials finely divided therein, and with an excess of hydrogen over the required quantity and preferably while maintaining the desired pressure by adding fresh gas and passing the gas either by circulation through one or more reaction vessels, or through a succession of reaction vessels, without circulation. The products are separated from the reaction gases by cooling or absorbing with a wash oil or solid adsorbents or in any suitable manner.

The gases serving for the reaction may consist of hydrogen alone or of mixtures containing hydrogen, for example a mixture of hydrogen and nitrogen, or water gas, or hydrogen mixed with carbon dioxide, hydrogen sulphide, water vapor, methane or other hydrocarbons. The hydrogen may be obtained by decomposing the gaseous hydrocarbons formed during the treatment and to be found in the reaction gases, by burning with a restricted quantity of oxygen so as to combine substantially with the carbon to form carbon monoxide and setting free the hydrogen. Or the gaseous hydrocarbons may be decomposed with steam at a high temperature, or with mixtures of water vapor and oxygen. Catalysts may be employed for facilitating the said decomposition, for example nickel-coated magnesia or other solid bodies, a melt of iron or iron alloys and others, and the decomposition may take place either at ordinary pressure or under a pressure identical with that prevailing in the destructive hydrogenation in order to save compression energy.

Depending on the conditions of working, for example temperature and pressure employed, or duration of the treatment, the products are poor or rich in liquid hydrocarbons of low boiling point. Generally the reaction temperature ranges between 300° and 700° C. and preferably temperatures of about 400° to 480° C. are employed for the reaction By the said treatment, the original material is split up into smaller molecules which partly may recombine to form products of a higher order, and at the same time oxygen compounds and unsaturated bodies contained therein or formed by the splitting process are reduced and hydrogenated, the whole of which transformations we designate as "destructive hydrogenation".

In order to avoid an attack of the apparatus by sulphur or other influences, which is a serious difficulty in the practical performance of the process, we have found it excellently suitable to compose or line the apparatus where it may come into contact with hot gaseous, liquid or solid carbonaceous material, of aluminium or its alloys which metals may be used until near to their melting point; also chromium and its alloys prove very resistant to the attack in the course of the operation and withstand also all temperatures which may come into question. Especially chromium itself, chiefly as a lining or coating, or alloys containing more than 10 per cent of chromium and not more than 0.2 per cent, preferably less than 0.1 per cent of carbon, are very suitable. At the same time a content of nickel amounting to 40 per cent or more makes a very useful material which is not attacked even if in use for a very long time.

The liquid hydrocarbons obtained generally, have a very low content of sulphur or are free therefrom, and are excellently suitable for use as fuel for internal combustion engines, or as lubricating oils if they are products of a higher boiling point. The low boiling fractions may be mixed with other fuels, for example, benzines or ordinary gasoline, benzol, or lower alcohols of the aliphatic series, and possess the remarkable property of being miscible to a large degree with the latter, particularly with methanol. A mixture containing 60 per cent of a hydrocarbon obtained from crude oil in accordance with the described process, 30 per cent of gasoline and 10 per cent of methanol may be cited as an example. The products are also excellent solvents for a great variety of bodies.

The following examples will further illustrate the nature of the said invention, but the invention is not restricted thereto.

*Example 1*

25 cubic centimeters per hour of a middle oil obtained by distillation of brown coal tar oil, boiling between 225° and 318° C. (20 per cent boiling up to 250° C. and further 66.6 per cent between 250° and 300° C.), having a specific gravity of 0.893 and containing 25 per cent of phenols and 43 per cent of unsaturated hydrocarbons are vaporized and passed at 480° C. and under a pressure of 12 atmospheres over 200 cubic centimeters of a catalyst consisting of tungstic acid. In this manner a liquid product is obtained boiling up to 318° C. 3.1 per cent boiling up to 100° C., further 22.2 per cent between 100° and 180° C., further 5.3 per cent between 180° and 200° C., further 29.4 per cent between 200° and 250° C.

and further 35.4 per cent between 250° and 300° C.), having a specific gravity of 0.847 and containing 7.5 per cent of phenols and 10 per cent of unsaturated hydrocarbons.

Example 2

The vapors of the same middle oil as employed in Example 1 are passed under the same conditions as described in this example over tungstic disulphide. In this manner a liquid product is obtained boiling up to 318° C. (5.2 per cent boiling up to 100° C., further 25.2 per cent between 100° and 180° C., further 6.3 per cent between 180° and 200° C., further 27.6 per cent between 200° and 250° C. and further 31.5 per cent between 250° and 300° C.), having a specific gravity of 0.838 and containing 6.0 per cent of phenols and 7 per cent of unsaturated hydrocarbons.

What we claim is:—

1. Process of converting carbonaceous substances, such as solid and liquid fuels, distillation and extraction products thereof, into valuable liquids which comprises treating them with an excess of hydrogen at a temperature between 300° and 700° C., under pressure less than 20 atmospheres and in the presence of tungsten sulfide.

2. Process of converting carbonaceous substances such as solid and liquid fuels, distillation and extraction products thereof, into valuable liquids which comprises treating them with hydrogen at a temperature of between about 300° and 700° C., at a pressure between 1 and 20 atmospheres and in the presence of tungsten sulfide.

CARL KRAUCH.
MATHIAS PIER.